C. B. WEBSTER.
TIRE VALVE COMPRESSOR.
APPLICATION FILED JUNE 17, 1920.
1,391,228.
Patented Sept. 20, 1921.
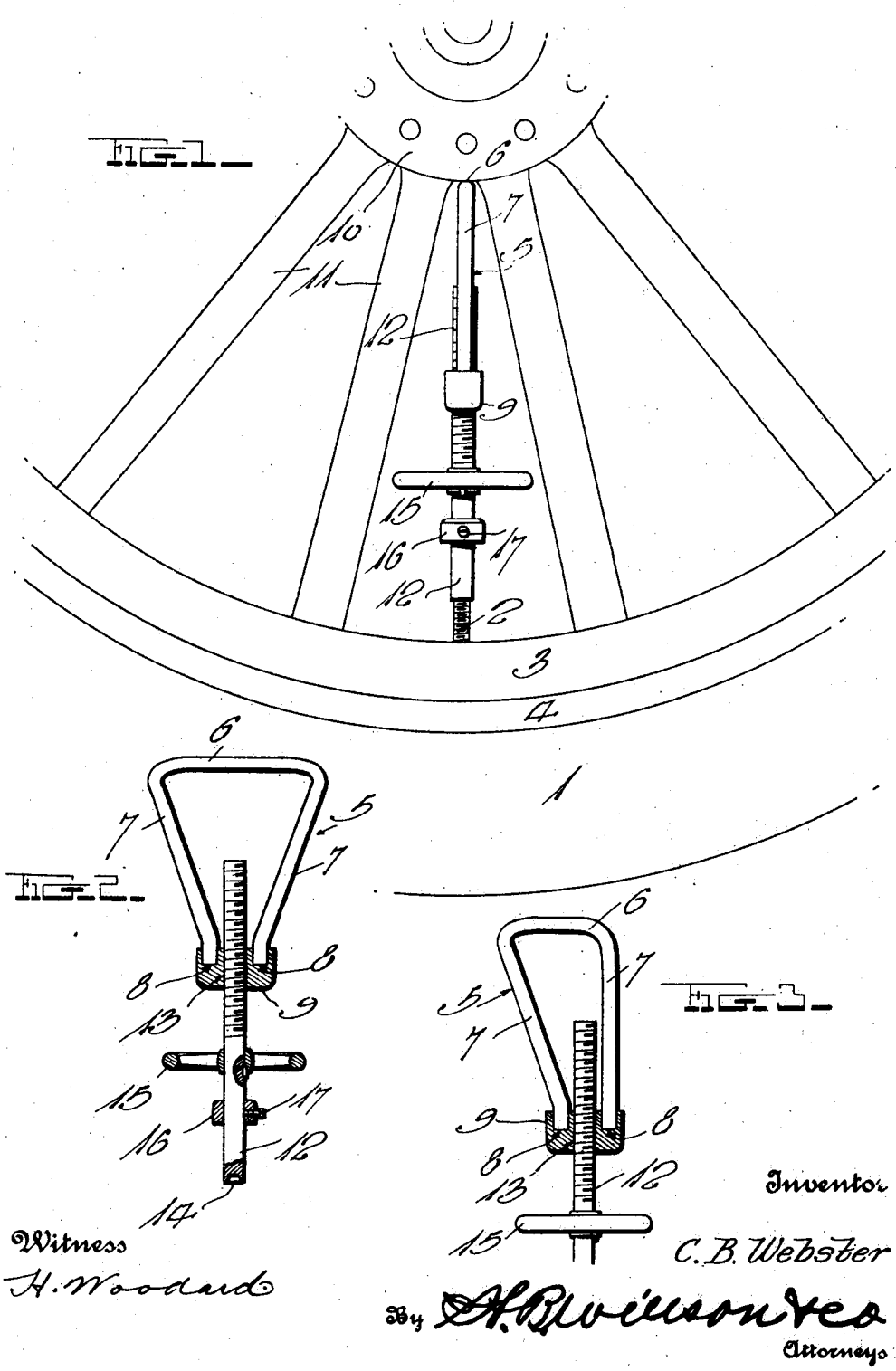
Witness
H. Woodard
Inventor
C. B. Webster
By H. B. Wilson &co
Attorneys

UNITED STATES PATENT OFFICE.

CHARLES B. WEBSTER, OF FALL RIVER, MASSACHUSETTS.

TIRE-VALVE COMPRESSOR.

1,391,228.  Specification of Letters Patent.  Patented Sept. 20, 1921.

Application filed June 17, 1920. Serial No. 389,711.

*To all whom it may concern:*

Be it known that I, CHARLES B. WEBSTER, a citizen of the United States, residing at Fall River, in the county of Bristol and State of Massachusetts, have invented certain new and useful Improvements in Tire-Valve Compressors; and I do declare the following to be a full, clear, and exact description of the invention, such as will enable others skilled in the art to which it appertains to make and use the same.

This invention relates to an improved compressor for use when removing a tire from an automobile wheel rim and one object of the invention is to provide a compressor so constructed that the valve stem may be forced through the opening in the rim and felly of the wheel and thus the tire easily removed without danger of breaking the stem or tearing the same loose from the tube.

Another object of the invention is to so construct this device that a gage may be provided which will limit movement of the compressor through the felly and rim and thus prevent the valve stem from being forced beyond the necessary amount.

Another object of the invention is to so construct this device that one end may engage the hub of the wheel and the second end portion engage the valve stem, the two end portions being in threaded engagement and the second end portions being rotated to longitudinally adjust the device and thus force the stem through the rim and felly.

Another object of the invention is to provide a device which will be very simple in construction and very easy to operate and which may be so constructed that it can be used upon a rear wheel carrying a brake drum as well as upon a front wheel in which no brake drum is provided.

This invention is illustrated in the accompanying drawings, wherein:

Figure 1 is a side elevation showing the device applied to a wheel,

Fig. 2 is a fragmentary view of the device partially in side elevation and partially in section, and Fig. 3 is a view similar to Fig. 2, showing the device constructed for use in connection with a wheel carrying a brake drum.

This device is for use in connection with removing a tire 1 and is intended to engage the valve stem 2 for forcing the valve stem through the registering openings of the felly 3 and rim 4. The device is provided with a shoe 5 which is formed from a relatively heavy rod bent to provide a cross head 6 and arms 7 which are firmly mounted in sockets 8 formed in a block 9. From an inspection of Figs. 2 and 3 it will be seen that the cross head which engages the hub 10 of the wheel between the spokes 11 may be relatively wide and the arms 7 carried through the block 9 in converging relation or the cross head may be formed shorter and one of the arms 7 extended at substantially right angles to the same with the second extended in converging relation to the first arm. Therefore, the device if constructed as shown in Fig 2 may be used upon a wheel which does not carry a brake drum or if constructed as shown in Fig. 3 it may be used upon a wheel carrying a brake drum without the brake drum interfering with the proper positioning of the device between the hub and valve stem 2. A threaded stem 12 which passes through a threaded opening 13 in the block 9 has its outer end portion provided with a cup 14 so that the device may have firm engagement with the end of the valve stem without danger of slipping off of the stem. This threaded stem or plunger is provided with a hand wheel 15 by means of which the plunger may be easily rotated and thus moved longitudinally for increasing or decreasing the distance between the cross head 6 and the outer end of the plunger.

When this device is in use, it is put in place as shown in Fig. 1 and the plunger 12 is then rotated by means of the hand wheel 15 so that the plunger will move outwardly and thus force the valve stem 2 through the openings formed in the felly and rim. As soon as the valve stem has been forced through these openings, it can then be moved to one side and the tire easily removed without danger of breaking the stem or tearing the stem loose from the tire. When this device is used, it is desired to prevent the stem from being forced beyond a desired amount and therefore a collar 16 has been placed upon the plunger and a set screw 17 provided so that the collar may be releasably held in a set position. It will thus be seen that this collar may be set upon the plunger at the desired point and will engage the face of the felly 3 and thus provide a stop which will limit movement of the plunger and prevent the valve stem from being forced beyond the desired amount.

What is claimed is:

1. A valve stem compressor comprising a hub engaging element, a plunger having threaded connection with the hub engaging element and adapted to engage the end of a valve stem, means for rotating the plunger to move the same outwardly and force a valve stem through a wheel felly and rim, and means for engaging a wheel felly to limit movement of the plunger through the felly and rim.

2. A valve stem compressor comprising a hub engaging element including a block provided with a threaded opening and a shoe having a cross head for engaging a hub and side arms rigidly connected with the block, and a valve stem engaging plunger having one end portion adapted for engagement with a valve stem and having its opposite end portion threaded and passing through the threaded opening of the block.

3. A valve stem compressor comprising a hub engaging element including a bearing block having a threaded opening formed therein, a stem engaging plunger having one end portion threaded and passing through the threaded opening of the block, a collar adjustably mounted upon the plunger for engaging a felly and limiting movement of the plunger through a stem receiving opening of the felly, and means for imparting rotary movement to the plunger.

In testimony whereof I have hereunto set my hand in the presence of two subscribing witnesses.

CHARLES B. WEBSTER

Witnesses:
 PRESTON H. HOOD,
 CARL K. LINCOLN.